United States Patent
Yamaguchi et al.

(10) Patent No.: US 7,552,963 B2
(45) Date of Patent: Jun. 30, 2009

(54) VEHICLE BODY REAR STRUCTURE

(75) Inventors: Toshizumi Yamaguchi, Wako (JP); Satoru Kawabe, Wako (JP); Takumi Tsuyuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/016,581

(22) Filed: Jan. 18, 2008

(65) Prior Publication Data

US 2008/0252104 A1  Oct. 16, 2008

(30) Foreign Application Priority Data

Jan. 19, 2007  (JP)  ............................. 2007-010064

(51) Int. Cl.
*B60J 7/00* (2006.01)
(52) U.S. Cl. .............................. 296/187.08; 296/203.04
(58) Field of Classification Search ............ 296/187.12, 296/187.08, 193.07, 193.08, 203.04
See application file for complete search history.

(56) References Cited

U.S. PATENT DOCUMENTS

| 6,834,910 B2 | 12/2004 | Wendland et al. |
| 6,966,592 B2 * | 11/2005 | Harima et al. ............. 296/37.2 |
| 2007/0096508 A1 * | 5/2007 | Rocheblave et al. ... 296/193.07 |

* cited by examiner

*Primary Examiner*—Joseph D Pape
(74) *Attorney, Agent, or Firm*—Rankin, Hill & Clark LLP (57) ABSTRACT

A vehicle body rear structure, which includes: rear frames disposed on both side of a rear portion of a vehicle; a rear floor cross member bridged between the rear frames and jointed to each of the rear frames; a middle floor cross member which is disposed ahead of the rear floor cross member to extend in a vehicle width direction; and a stiffening panel covering a lower side of a fuel tank which is disposed in a space surrounded by the each of the rear frames, the rear floor cross member, and the middle floor cross member. The stiffening panel comprises an upper plate, a lower plate, and a connecting member which connects the upper plate and the lower plate. Furthermore, the stiffening panel has a thickness which transmits a load upon a rear-end collision to a framework member ahead of the stiffening panel.

7 Claims, 6 Drawing Sheets

VEHICLE BODY REAR STRUCTURE

CROSS REFERENCE TO RELATED APPLICATIONS

This application claims the foreign priority benefit under Title 35, United States Code, §119(a)-(d) of Japanese Patent Application No. 2007-010064, filed on Jan. 19, 2007, the contents of which are hereby incorporated by reference.

BACKGROUND OF THE INVENTION

1. Field of the Invention

The present invention relates to a vehicle body rear structure.

2. Description of Related Art

Figure 6:
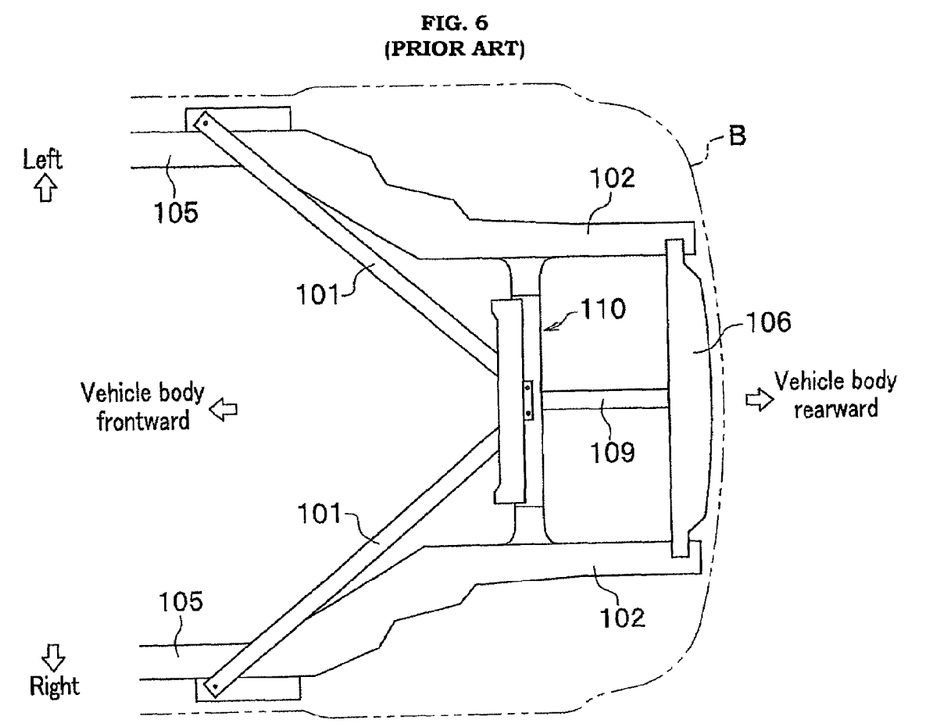
FIG. 6 is a bottom plane view schematically showing a conventional vehicle body rear structure as seen from a bottom side of a vehicle body.

Conventionally, a vehicle body rear structure which is provided with approximately a Y-shaped stiffening structure in plane view has been known. This is disclosed in, for example, U.S. Pat. No. 6,834,910. FIG. 6 is a bottom plane view schematically showing a conventional vehicle body rear structure as seen from a bottom side of a vehicle body.

As shown in FIG. 6, the stiffening structure is formed in approximately a Y-shape by a support member 109 and a pair of tension-compression bars 101 (tank lower frames). The support member 109 is disposed at approximately a center of a vehicle body B in a vehicle width direction, and extends in a front-rear direction of the vehicle body B. A rear end of the support member 109 is jointed to a cross support member 106 (rear floor end cross member), and a front end of the support member 109 is jointed to a receiving bracket 110. It is noted that the cross support member 106 is jointed to each rear end portion of the rear frames 102.

Each rear end of the tension-compression bars 101 is jointed to the receiving bracket 110 at a position close to a center of the vehicle body B, and each front end of the tension-compression bars 101 extending to each of side sills 105 in approximately the V-shape is jointed to the each of the side sills 105.

The vehicle body rear structure described above has a reinforced structure from the cross support member 106 disposed on a rear side of the vehicle body B to the side sills 105 disposed on the right and left sides of the vehicle body B via the support member 109, receiving bracket 110, and tension-compression bars 101.

However, in the vehicle body rear structure, the support member 109 has been disposed to be inclined downward from the cross support member 106 to the receiving bracket 110. Therefore, when a load upon a rear-end collision is input to the cross support member 106, there has been a possibility that the load may not be sufficiently transmitted to the receiving bracket 110 from the cross support member 106 via the support member 109. As a result, in the conventional vehicle body rear structure described above, it has been difficult to effectively disperse the input load into the receiving bracket 110, tension-compression bars 101, and side sills 105 via the tension-compression bars 101.

Figure 7:
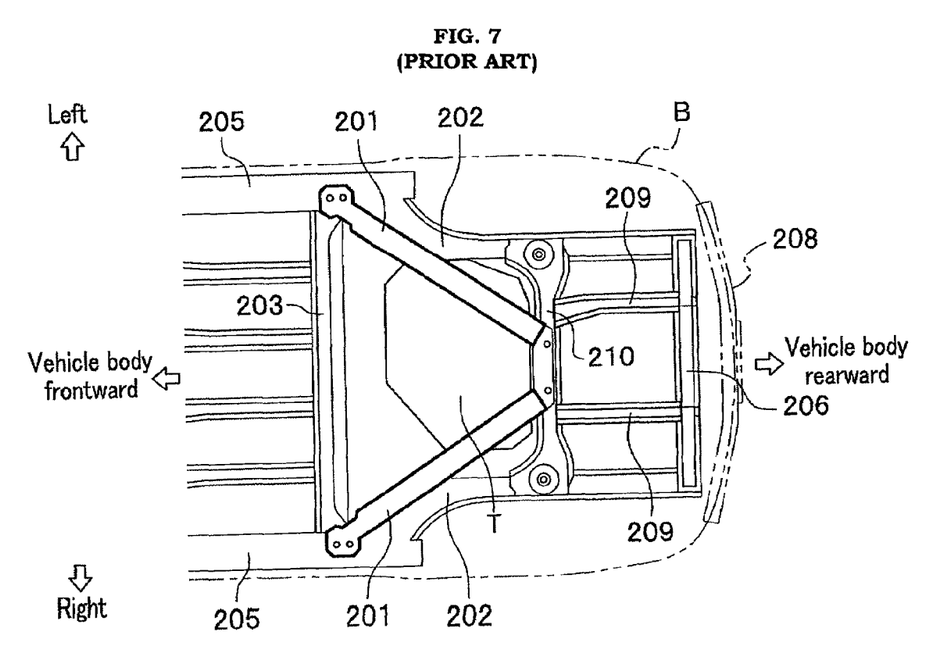
FIG. 7 is a bottom plane view schematically showing a vehicle body rear structure having spare pan frames which are disposed horizontally as seen from a bottom side of a vehicle body.

Therefore, for solving the above issue, the applicant had proposed a vehicle body rear structure having a spare pan frame which is horizontally disposed. This is disclosed in Japanese Patent Application No. 2006-238422 (not laid-open). FIG. 7 is a bottom plane view schematically showing a vehicle body rear structure having a spare pan frame which is horizontally disposed as seen from a bottom side of the vehicle body.

As shown in FIG. 7, the vehicle body rear structure includes a rear floor end cross member 206 which is bridged between each of rear frames 202 and jointed to the each of the rear frames 202, a rear floor cross member 210, and a middle floor cross member 203 which is located ahead of the rear floor cross member 210 and bridged between each of side sills 205 and jointed to the each of the side sills 205. In addition, the vehicle body rear structure further includes a pair of tank lower frames 201 and a pair of the spare pan frames 209.

Each rear end of the tank lower frames 201 is jointed to the rear floor cross member 210 at approximately a center in the vehicle width direction. Each of the tank lower frames 201 extents approximately in a Y-shape toward each side of the vehicle body B from the rear floor cross member 210, and each front end of the tank lower frames 201 is jointed to each of the side sills 205. The spare pan frames 209 extend between the rear floor end cross member 206 and rear floor cross member 210 in the font-rear direction of the vehicle, and jointed to the rear floor end cross member 206 and rear floor cross member 210. The spare pan frames 209 are arranged substantially horizontally between the rear floor end cross member 206 and rear floor cross member 210. It is noted that a fuel tank T is disposed in a space surrounded by each of the rear frames 202, rear floor cross member 210, and middle floor cross member 203, and the tank lower frames 201 are disposed beneath the fuel tank T.

In the vehicle body rear structure described above, a load upon a rear-end collision is transmitted to the side sills 205 via the rear floor end cross member 206, spare pan frames 209, rear floor cross member 210, and tank lower frames 201. In this case, since the spare pan frames 209 are arranged horizontally different from a case of the support member 109 (see FIG. 6) of the conventional vehicle body rear structure (for example, U.S. Pat. No. 6,834,910), the load is effectively transmitted to the tank lower frames 201 via the spare pan frames 209. As a result, the load is effectively dispersed in the vehicle body rear structure.

However, in the vehicle body rear structure, significant irregularities are formed on a bottom side of the vehicle body B by the rear floor cross member 210, tank lower frames 201, middle floor cross member 203, and the fuel tank T disposed in a space surrounded by the above members which are disposed on the bottom side of the rear portion of the vehicle body B. That is, although the vehicle body rear structure can improve a collision safety performance, an aerodynamic performance of the vehicle is decreased by the irregularities on the bottom side.

It is, therefore, an object of the present invention to provide a vehicle body rear structure which can improve both the collision safety performance upon a rear-end collision and aerodynamic performance of a vehicle.

SUMMARY OF THE INVENTION

A vehicle body rear structure according to the present invention which has solved the issues described above is characterized as follows.

According to a first aspect of the present invention, there is provided a vehicle body rear structure, which includes: rear frames disposed on both side of a rear portion of a vehicle; a rear floor cross member bridged between the rear frames and jointed to each of the rear frames; a middle floor cross member which is disposed ahead of the rear floor cross member to extend in a vehicle width direction; and a stiffening panel covering a lower side of a fuel tank which is disposed in a space surrounded by the each of the rear frames, the rear floor cross member, and the middle floor cross member. The stiffening panel comprises an upper plate, a lower plate, and a connecting member which connects the upper plate and the lower plate. Furthermore, the stiffening panel has a thickness which transmits a load upon a rear-end collision to a framework member ahead of the stiffening panel.

In the vehicle body rear structure, the structure has the thickness (strength due to thickness) which can transmit the load input upon a rear-end collision from the rear floor cross member to the framework member which is disposed ahead of the stiffening panel. That is, the stiffening panel of the vehicle body rear structure is constituted so as to transmit the load input in the front-rear direction of the vehicle.

In the vehicle body rear structure, when the load is input along the front-rear direction of the stiffening panel, the stiffening panel efficiently transmits the load to the framework member via the middle floor cross member. As a result, a transmission of the load via the rear frames, which are offset above the stiffening panel, is reduced in the vehicle body rear structure. That is, since a transmission efficiency of the load upon a rear-end collision is increased by the stiffening panel, an excellent collision energy absorption can be achieved in the vehicle body rear structure.

Therefore, a collision safety performance of the vehicle body rear structure upon a rear-end collision can be increased. In addition, in the vehicle body rear structure, since the stiffening panel covers the lower side of the fuel tank, both the upper and lower sides of the fuel tank can be protected.

In addition, in the vehicle body rear structure, since the stiffening panel reduces irregularities on the bottom side of the vehicle body, an aerodynamic performance of the vehicle provided with the vehicle body rear structure can be increased in running.

In the vehicle body rear structure described above, it is preferable that the stiffening panel has a corrugated cross section, and peak portions and trough portions of the corrugated cross section are formed to continue in the vehicle width direction.

In addition, in the vehicle body rear structure described above, the stiffening panel further includes a stiffening structure. The stiffening structure may form a part of the peak portions and trough portions of the corrugated cross section, and may be constituted to transmit the load input in a front-rear direction of a vehicle body.

In addition, in the vehicle body rear structure described above, the stiffening panel may be formed in a sandwich structure which sandwiches at least one selected from a group of a foamed material, a filler, and a honeycomb material.

In addition, in the vehicle body rear structure described above, it is preferable that the stiffening panel has a sandwich structure which sandwiches a core member, and a direction having a high rigidity in the core member is arranged along a front-rear direction of the vehicle body.

In the vehicle body rear structure according to the present invention, both the collision safety performance upon a rear-end collision and aerodynamic performance of the vehicle can be increased concurrently.

DETAILED DESCRIPTION OF THE PREFERRED EMBODIMENT

First Embodiment

Figure 1A:
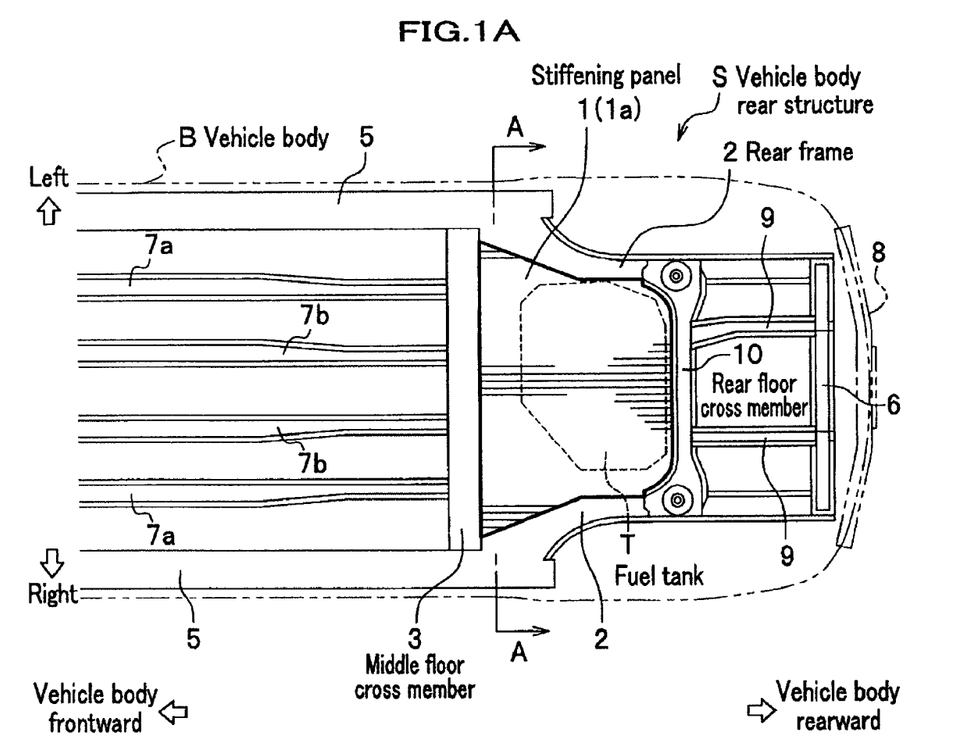
FIG. 1A is a bottom plane view schematically showing a vehicle body structure including a vehicle body rear structure according to a first embodiment of the present invention.
Figure 1B:
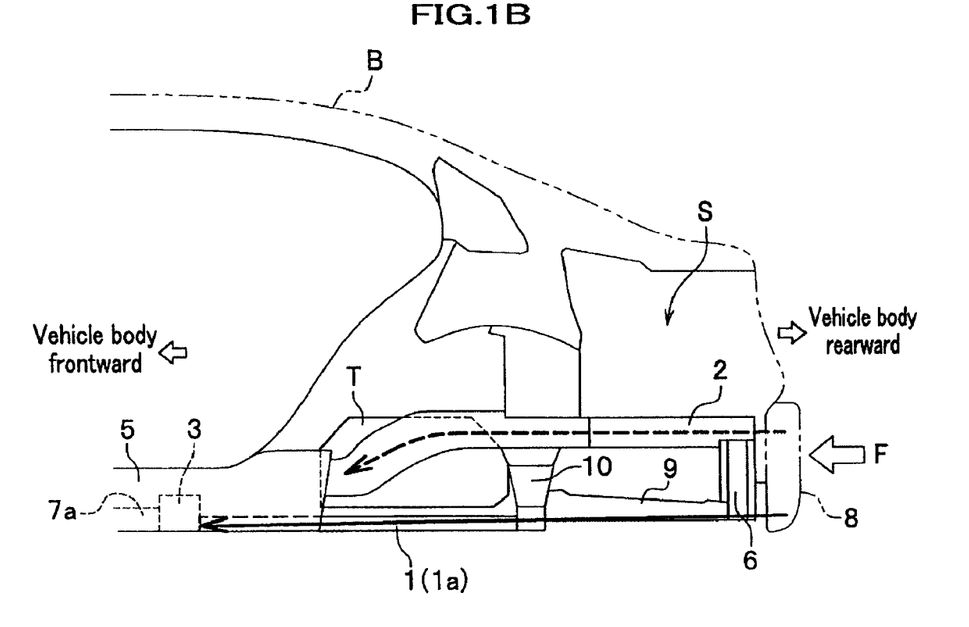
FIG. 1B is a side view schematically showing a vehicle body rear structure according to the first embodiment.
Figure 2:
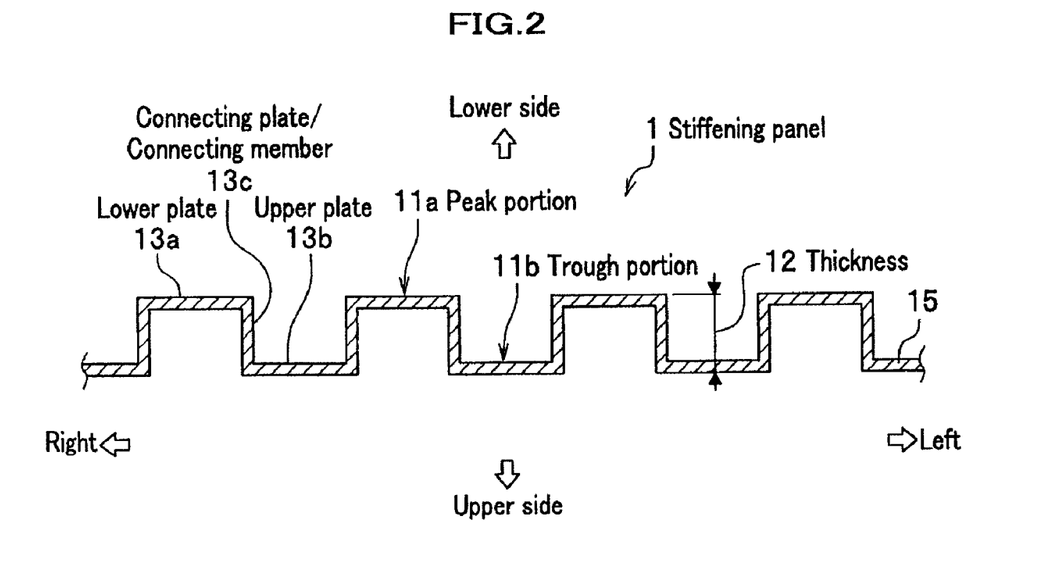
FIG. 2 is a partial cross sectional view partially showing a stiffening panel taken along an A-A line in FIG. 1A.
Figure 3A:
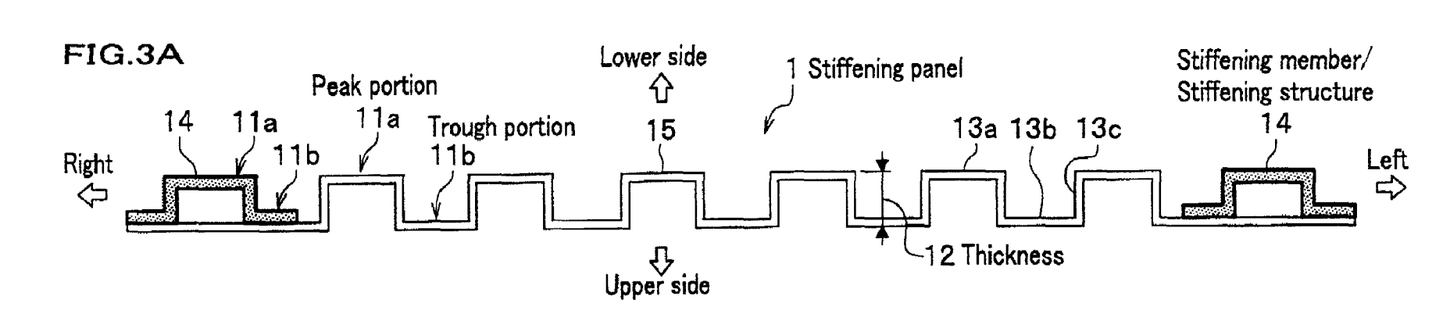
FIG. 3A to FIG. 3C are cross sections of modified samples of a stiffening panel to be used for a vehicle body rear structure according to the first embodiment.
Figure 3B:
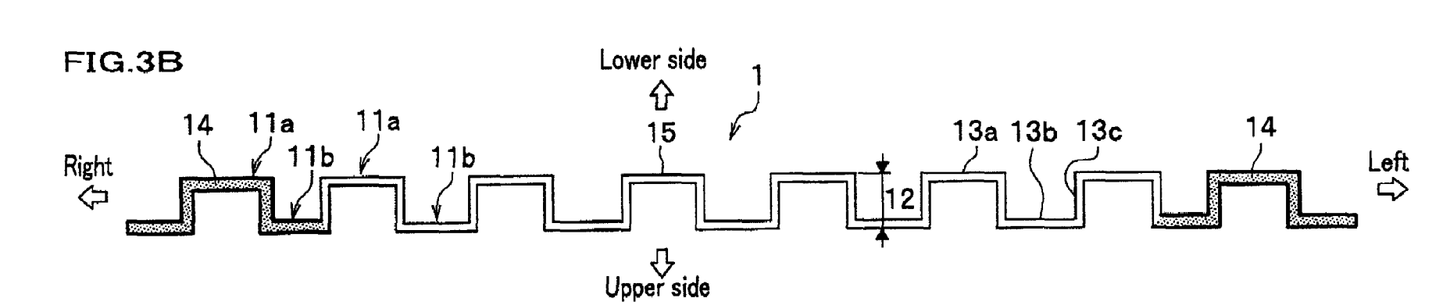
Figure 3C:
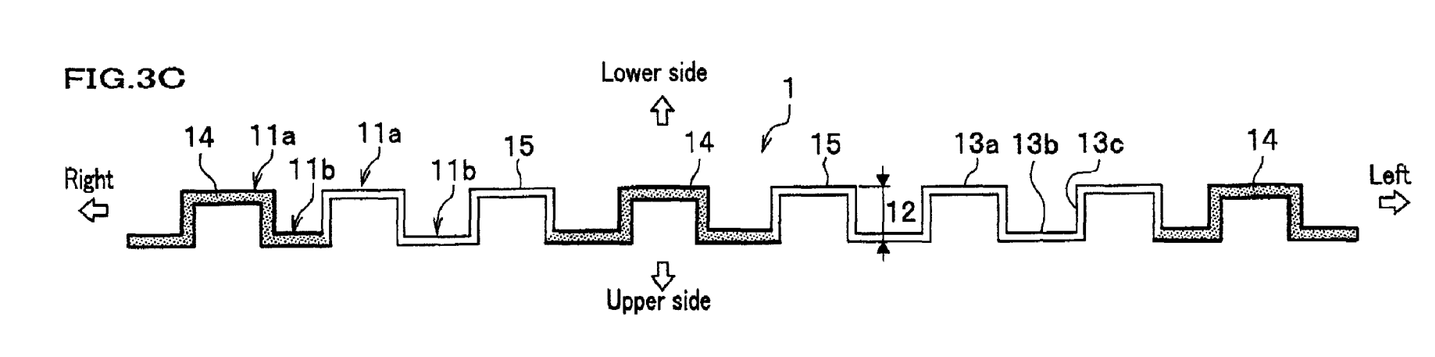

Next, a vehicle body rear structure according to a first embodiment of the present invention will be explained in detail by referring to drawings as needed. FIG. 1A is a bottom plane view schematically showing a vehicle body structure including a vehicle body rear structure according to the first embodiment. FIG. 1B is a side view schematically showing the vehicle body rear structure according to the first embodiment. FIG. 2 is a partial cross sectional view partially showing a stiffening panel taken along an A-A cross section in FIG. 1A. FIG. 3A to FIG. 3C are cross sectional views showing modified samples of a stiffening panel to be used for a vehicle body rear structure according to the first embodiment. It is noted that in the explanations hereinafter, directions of left, right, top and bottom are based on the left, right, top and bottom of a vehicle (automobile) which is normally on the ground.

As shown in FIG. 1A, a vehicle body rear structure S according to the embodiment is characterized in that the vehicle body rear structure S includes a stiffening panel 1, which will be described later.

Here, first, a whole vehicle body structure including the vehicle body rear structure S according to the embodiment will be explained.

In the vehicle body structure, the vehicle body rear structure S includes rear frames 2, a pair of side sills 5, a pair of front floor frames 7a, and tunnel frames 7b. The rear frames 2 extend in a front-rear direction of a vehicle body B on both right and left sides in a rear portion of the vehicle body B. The pair of the side sills 5 extend to a front of the vehicle body B from the rear frames 2. The pair of the front floor frames 7a extend to an area between the right and left side sills in the front-rear direction of the vehicle body B. The tunnel frames 7b extend to an area between the front floor frames 7a in the front-rear direction of the vehicle body B.

In addition, the vehicle body rear structure S further includes a rear floor end cross member 6, a rear floor cross member 10, and a middle floor cross member 3. The rear floor end cross member 6 is located in front of a bumper beam 8 and extends in a vehicle width direction to be jointed to each rear end of the rear frames 2. The rear floor cross member 10 is located ahead of the rear floor end cross member 6 and extends in the vehicle width direction to be jointed to each of the rear frames 2. The middle floor cross member 3 is located on rear end sides of the front floor frames 7a and extends in the vehicle width direction to be jointed to the front floor frames 7a and side sills 5. It is noted that a rear floor panel, which is not shown, is extended toward a rear portion (toward rear floor end cross member 6) of the vehicle body B from the middle floor cross member 3.

In addition, the vehicle body rear structure S includes a pair of spare pan frames 9 which extend between the rear floor end cross member 6 and rear floor cross member 10 in the front-rear direction to be jointed to the rear floor end cross member 6 and rear floor cross member 10. Each of the spare pan frames 9 is arranged to be located on each side of a spare pan (not shown) which is disposed in a rear portion of the rear floor panel and has a concave portion for storing a spare tire. It is noted that as shown in FIG. 1B, the spare pan frames 9 are disposed substantially horizontally from the rear floor end cross member 6 to the rear floor cross member 10.

The rear frames 2, rear floor end cross member 6, spare pan frames 9, and rear floor cross member 10 according to the embodiment described above are formed with a channel-shaped member, for example, a U-shaped member, whose upper face is open.

Next, the stiffening panel 1 described above will be explained in detail.

As shown in FIG. 1A, the stiffening panel 1 is disposed so as to cover a lower side of the fuel tank T which is disposed in a space surrounded by each of the rear frames 2, rear floor cross member 10, and middle floor cross member 3.

More specifically, as shown in FIG. 1B, the stiffening panel 1 according to the embodiment is disposed substantially horizontally between the middle floor cross member 3 and rear floor cross member 10, and a front end of the stiffening panel 1 is jointed to a rear side of the middle floor cross member 3 and a rear end of the stiffening panel 1 is jointed to a front side of the rear floor cross member 10. It is preferable that a horizontal height of the stiffening panel 1 is set to be substantially equal to that of the spare pan frames 9.

As shown in FIG. 2, a cross sectional shape of the stiffening panel 1 along the vehicle width direction has a rectangular corrugated shape. That is, the stiffening panel 1 is formed by a corrugated plate member 15 in which a peak portion 11a and trough portion 11b are continued in the vehicle width direction (right-left direction in FIG. 2) as seen from a lower side in FIG. 2 (bottom side of vehicle body B, see FIG. 1A). In other words, the stiffening panel 1 (corrugated plate member 15) is composed of a long upper plate 13b extending in the front-rear direction of the vehicle body B (see FIG. 1A, FIG. 1B), a long lower plate 13a extending in the front-rear direction of the vehicle body B, and a long connecting plate 13c for connecting the upper plate 13b and lower plate 13a. It is noted that the connecting plate 13c corresponds to a connecting member.

The stiffening panel 1 is formed by the upper plate 13b, lower plate 13a, and connecting plate 13c and has a predetermined thickness 12. By the predetermined thickness 12, the stiffening panel 1 is constituted so that a load input upon a rear-end collision from the rear floor cross member 10 is transmitted to framework members such as the front floor frames 7a, which are disposed in front of the stiffening panel 1. That is, the stiffening panel 1 in the vehicle body rear structure S is formed to transmit the load input in the front-rear direction of the vehicle body B.

A thickness, a cross sectional size, and a material of the stiffening panel 1 described above may be determined as needed according to requirements for a displacement-strength characteristic.

In addition, as described above, the stiffening panel 1 covers the space surrounded by each of the rear frames 2, the rear floor cross member 10, and the middle floor cross member 3. Therefore, as shown in FIG. 1A and FIG. 1B, the stiffening panel 1 is disposed to cover the irregularities formed by, for example, the rear floor cross member 10, middle floor cross member 3, and fuel tank T on the bottom side of the vehicle body B.

It is noted that the stiffening panel 1 according to the embodiment is not limited to that shown in FIG. 2. As shown in FIG. 3A to FIG. 3C, the stiffening panel 1 may includes a stiffening member 14. The stiffening member 14 corresponds to a stiffening structure.

The stiffening panel 1 shown in FIG. 3A is one in which a pair of the stiffening members 14 are additionally jointed as discrete members to both right and left peripheries of the corrugated plate member 15 which is a main body of the stiffening panel 1. The stiffening members 14 have a hat-shaped cross section, and are jointed to a lower side (bottom side of vehicle body B) of the corrugated plate member 15 such that the stiffening members 14 extend toward the rear floor cross member 10 from the middle floor cross member 3. The stiffening members 14 jointed as described above form a part of the peak portions 11a and trough portions 11b of the stiffening panel 1 by being combined with the peak portions 11a and trough portions 11b of the corrugated plate member 15. Therefore, the stiffening members 14 are arranged so that a load input upon a rear-end collision from the rear floor cross member 10 (see FIG. 1B) is transmitted to the framework members such as the front floor frames 7a (see FIG. 1B) which are arranged in front of the stiffening panel 1. That is, the stiffening members 14 are arranged to transmit the load which is input in the front-rear direction of the vehicle body B.

It is preferable that the stiffening members 14 described above have a thickness thicker than that of the corrugated plate member 15. In addition, it is preferable that a material of the stiffening members 14 has a strength higher than that of the corrugated plate member 15.

The stiffening panels 1 shown in FIG. 3B and FIG. 3C are different from the stiffening panel 1 shown in FIG. 3A. In the stiffening panels 1 shown in FIG. 3B and FIG. 3C, the stiffening member 14 having the hat-shape is built into the corrugated structure which is formed in the stiffening panels 1. In the stiffening panel 1 shown in FIG. 3B, the stiffening members 14 are arranged only on the right and left ends of the stiffening panel 1. On the other hand, in the stiffening panel 1 shown in FIG. 3C, the stiffening members 14 are arranged in a middle portion of the stiffening panel 1 in addition to the right and left ends of the stiffening panel 1. Integration of the stiffening member 14 into the corrugated plate member 15 can be achieved by tailored blank jointing.

In addition, in the stiffening panel 1 having the stiffening member 14 described above, an arrangement position and a number of the stiffening member 14 are not limited to the above, and may be changed as needed according to a strength design of the stiffening panel 1. Therefore, the stiffening member 14 may be disposed on only one side of the stiffening panel 1, or a plurality of the stiffening members 14 may be disposed in a middle portion of the stiffening panel 1.

In addition, a shape of the stiffening members 14 is not limited to the hat-shape, and may have a corrugated cross section having a plurality of peak portions and trough portions.

Next, operations and effects of the vehicle body rear structure S according to the embodiment will be explained.

As shown in FIG. 1B, in the vehicle body rear structure S, if a load F upon a rear-end collision is input into the bumper beam 8, the load F is transmitted to the front floor frames 7a and side sills 5 via the rear floor end cross member 6, spare pan frames 9, rear floor cross member 10, stiffening panel 1, and middle floor cross member 3, as well as the load F is transmitted to the side sills 5 from the rear frames 2. That is, the load F is dispersed into directions of the rear frames 2 and spare pan frames 9. In this case, since the spare pan frames 9 are arranged horizontally different from the arrangement of the support member 109 (see FIG. 6) of the conventional vehicle body rear structure (for example, U.S. Pat. No. 6,834,910), a dispersed component of the load F in the spare pan frames 9 direction is efficiently transmitted to the stiffening panel 1 via the spare pan frames 9. Accordingly, the load F is effectively dispersed into the vehicle body rear structure S.

In addition, as shown in FIG. 1B, in the vehicle body rear structure S, if the dispersed component of the load F is input along a front-rear direction of the stiffening panel 1, the stiffening panel 1 efficiently transmits the dispersed component of the load F to the framework members such as the front floor frames 7a by a whole stiffening panel 1 having the thickness 12 (see FIG. 2) via the middle floor cross member 3. In this case, since both the spare pan frames 9 and stiffening panel 1 are arranged horizontally, the dispersed component of the load F is more efficiently transmitted. Accordingly, in the vehicle body rear structure S, a transmission of the load via the rear frames 2, which are offset above the stiffening panel 1, is reduced. That is, in the vehicle body rear structure S, since a transmission efficiency of the load upon a rear-end collision is increased by the stiffening panel 1, an excellent energy absorption performance for the rear-end collision can be achieved.

Therefore, in the vehicle body rear structure S, a collision safety performance of a vehicle upon the rear-end collision can be improved. In addition, in the vehicle body rear structure S, since the stiffening panel 1 covers a lower side of the fuel tank T, the lower side of the fuel tank T can be protected as well as the upper side.

In addition, in the vehicle body rear structure S, since the vehicle body rear structure S is constituted so that the stiffening panel 1 reduces the irregularities formed on the bottom side of the vehicle body B as described above, an aerodynamic performance of a vehicle mounting the vehicle body rear structure S is improved in running. Specifically, in the vehicle, an air resistance due to the irregularities described above is reduced and a control of an aerodynamic lift becomes easy, thereby resulting in improvement of the stability of the vehicle in running.

In addition, in a vehicle provided with the vehicle body rear structure S, since the peak portions 11a and trough portions 11b of the stiffening panel 1 are formed along the front-rear direction of the vehicle body B, air flow lines are formed along the peak portions 11a and trough portions 11b in running. As a result, the stability of the vehicle in running is further improved.

In addition, in the vehicle body rear structure s, since an intermediate stiffening member is composed of one stiffening panel different from a case of the conventional vehicle body rear structure (for example, U.S. Pat. No. 6,834,910) in which a plurality of intermediate stiffening members (for example, a pair of tension-compression bars 101 shown in FIG. 6) are used, a number of component of the vehicle body rear structure S can be reduced.

Second Embodiment

Next, a vehicle body rear structure according to a second embodiment of the present embodiment will be explained by referring to drawings as needed. In the second embodiment, only a stiffening panel structure used for the vehicle body rear structure is different from that of the first embodiment. Therefore, explanations will be made mainly on the stiffening panel used for the second embodiment. FIG. 4A to FIG. 4D are cross sectional views of the stiffening panels used for the vehicle body rear structure according to the second embodiment. It is noted that FIG. 4A to FIG. 4D correspond to cross sections of the stiffening panel taken along an A-A line in FIG. 1A.

Figure 4A:
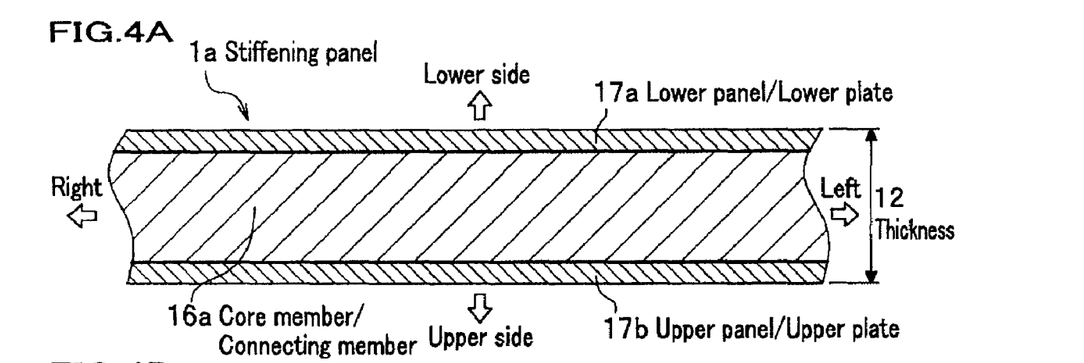
FIG. 4A to FIG. 4D are cross sections of stiffening panels to be used for a vehicle body rear structure according to a second embodiment.

As shown in FIG. 4A, a stiffening panel 1a to be used for the embodiment is composed of a core member 16a and an upper panel 17b and lower panel 17a which sandwich the core member 16a, and has a so-called sandwich structure. The core member 16a connects the upper panel 17b and lower panel 17a. It is noted that the core member 16a corresponds to a connecting member, and the upper panel 17b and lower panel 17a correspond to the upper plate and lower plate, respectively.

The core member 16a is formed in a shape identical to that of the stiffening panel 1 shown in FIG. 1A in plane view. As described above, the stiffening panel 1a, which is formed by sandwiching the core member 16a by the upper panel 17b and lower panel 17a, has the thickness 12 so that a load input upon a rear-end collision from the rear floor cross member 10 is transmitted to the framework structures such as the front floor frames 7a which are arranged in front of the stiffening panel 1a.

A material of the core member 16a is, for example, metal or resin. A material form of the core member 16a is, for example, a foamed material, filler formed in a plate, or honeycomb material.

The upper panel 17b and lower panel 17a are formed in a plate which has a shape identical to that of the core member 16a in plane view. Therefore, if the stiffening panel 1a is arranged as shown in FIG. 1A, the irregularities on the bottom side of the vehicle body B can be reduced.

Materials of the upper panel 17b and lower panel 17a are, for example, metal or resin.

It is noted that a connection between the core member 16a and the upper panel 17b and lower panel 17a is made by, for example, welding, bonding, or a mechanical connection by rivets, bolts and the like.

In the stiffening panel 1a as shown in FIG. 4A, for example, materials and sizes of the core member 16a, upper panel 17b, and lower panel 17a can be determined as needed according to a required displacement-strength characteristic.

Figure 4B:
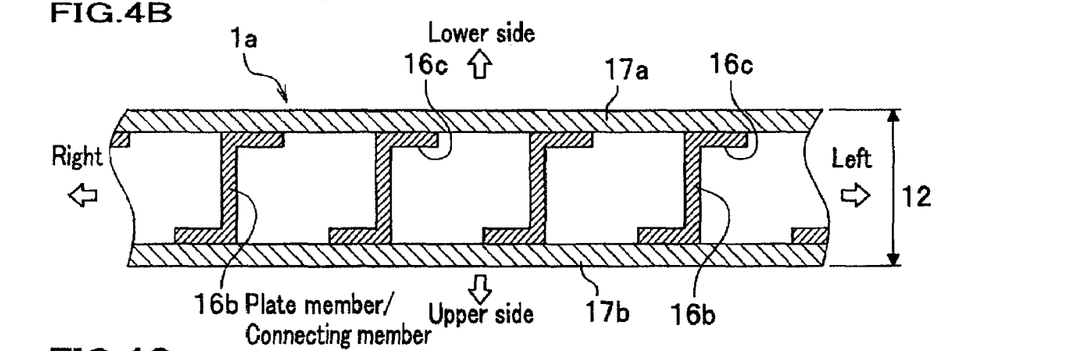

In addition, as shown in FIG. 4B, in the stiffening panel 1a according to the embodiment, the core member 16a shown in FIG. 4A may be replaced by a plurality of plate members 16b. Each of the plate members 16b extends in a front-rear direction of the stiffening panel 1a (front-rear direction of the vehicle B) and joints the upper panel 17b and lower panel 17a. Specifically, each of the plate members 16b is jointed to the upper panel 17b and lower panel 17a by a support portion 16c which is formed at an upper end and lower end of the plate member 16b, and extends between the middle floor cross member 3 and rear floor cross member 10 to be jointed to the middle floor cross member 3 and rear floor cross member 10. That is, a longitudinal direction, which has a high rigidity, of the plate member 16b, which corresponds to the core member, is arranged along the front-rear direction of the vehicle body B.

Accordingly, the stiffening panel 1a shown in FIG. 4B transmits a load, which is input upon a rear-end collision from the rear floor cross member 10, to the framework members such as the front floor frames 7a which are disposed in front of the stiffening panel 1a.

In the stiffening panel 1a as shown in FIG. 1B, for example, a number of the plate member 16b, materials and thicknesses of the panel 17a, panel 17b, and plate member 16b can be determined as needed according to the required displacement-strength characteristic.

Figure 4C:
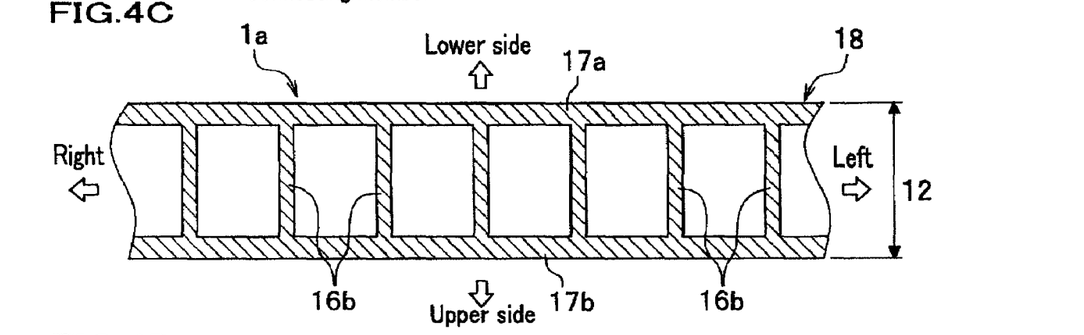

In addition, as shown in FIG. 4C, the stiffening panel 1a in which the core member 16a is composed of the plurality of the plate members 16b may be a mold material 18 in which the upper panel 17b, lower panel 17a, and plate members 16b connecting the upper panel 17b and lower panel 17a are integrally molded.

Figure 4D:
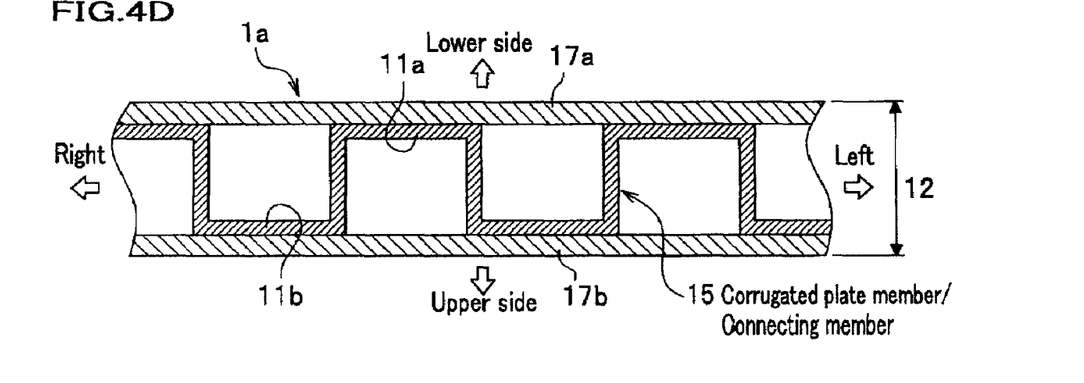

In addition, as shown in FIG. 4D, in the stiffening panel 1a, the core member 16a shown in FIG. 4A may be replaced by the corrugated plate members 15 according to the first embodiment. In the stiffening panel 1a, the peak portions 11a and trough portions 11b of the corrugated plate members 15 extend in the front-rear direction of the stiffening panel 1a (front-rear direction of the vehicle B), and connect the upper panel 17b and lower panel 17a. That is, an extending direction of the peak portions 11a (trough portions 11b), which has a high rigidity, of the corrugated plate member 15 which corresponds to the core member, is arranged along the front-rear direction of the vehicle body B.

The vehicle body rear structure S (see FIG. 1A) provided with the stiffening panel 1a described above has effects identical to those of the vehicle body rear structure S according to the first embodiment. In addition, since a surface of the stiffening panel 1a (surface of lower panel 17a) is flat, the air resistance of the vehicle body rear structure S according to the second embodiment is further reduced, compared with that of the vehicle body rear structure S according to the first embodiment.

In addition, in the vehicle body rear structure S (see FIG. 1A) provided with the stiffening panel 1a, when the stiffening panel 1a having a desired displacement-strength characteristic is designed, the displacement-strength characteristic can be adjusted in a wide range by combining, for example, the materials and sizes of the core member 16a, upper panel 17b, and lower panel 17a. Accordingly, a design freedom of the stiffening panel 1a can be expanded.

It is noted that the present invention is not limited to the first and second embodiments, and can be embodied in various forms.

In the vehicle body rear structure S according to the first and second embodiments, a maintenance opening (not shown) may be disposed in the stiffening panel 1 and stiffening panel 1a.

Figure 5:
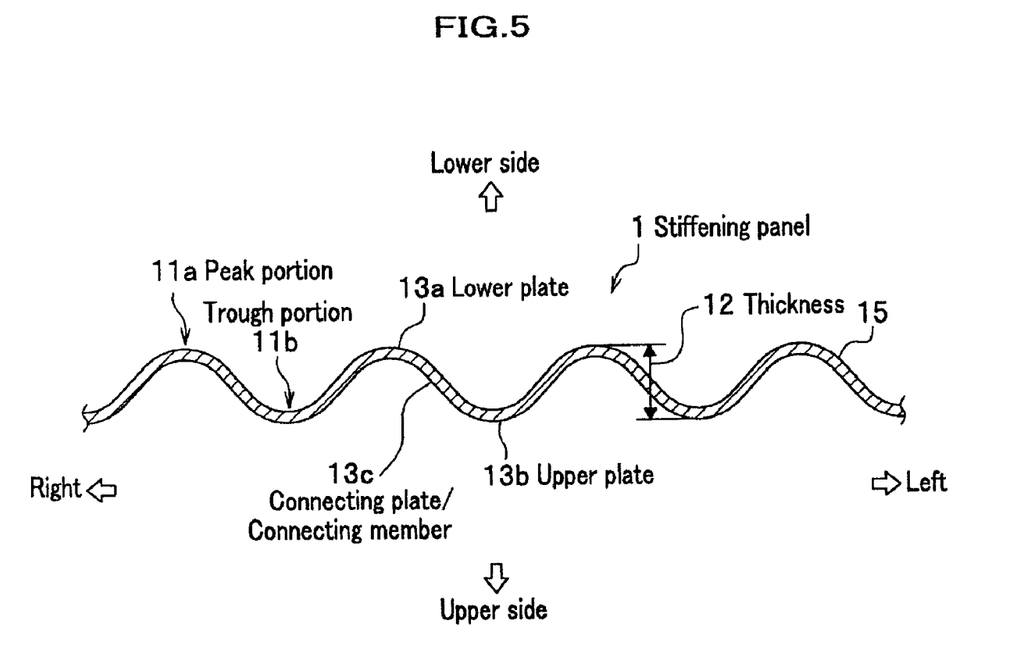
FIG. 5 is a cross sectional view showing a modified sample of a stiffening panel to be used for a vehicle body rear structure according to the first embodiment.

In addition, in the vehicle body rear structure S according to the first embodiment, the corrugated plate member 15 having the rectangular cross section is used for the stiffening panel 1. However, the present invention is not limited to this. FIG. 5 is a cross sectional view showing a modified sample of a stiffening panel to be used for the vehicle body rear structure according to the first embodiment.

As shown in FIG. 5, a wave pattern of the corrugated plate member 15 may be, for example, a circular arc such as a sine wave. In the corrugated plate member 15, a top portion neighborhood of the peak portion 11a corresponds to the lower plate 13a, a bottom portion neighborhood of the trough portion 11b corresponds to the upper plate 13b, and a slope portion neighborhood corresponds to the connecting plate 13c. In addition, although not shown, a wave pattern of the corrugated plate member 15 may have a cross section of, for example, triangle or polygonal equal to or more than pentagon.

What is claimed is:

1. A vehicle body rear structure, comprising:
   rear frames disposed on both sides of a rear portion of a vehicle;
   a rear floor cross member bridged between the rear frames and jointed to each of the rear frames;
   a middle floor cross member which is disposed ahead of the rear floor cross member to extend in a vehicle width direction;
   a stiffening panel covering a lower side of a fuel tank which is disposed in a space surrounded by the rear frames, the rear floor cross member, and the middle floor cross member;
   a spare pan frame; and
   a rear floor end cross member,
   wherein the spare pan frame is jointed to the rear floor end cross member and the rear floor cross member, and
   wherein the stiffening panel has a thickness which transmits a load upon a rear-end collision to a framework member in front of the stiffening panel.

2. The vehicle body rear structure according to claim 1, wherein the stiffening panel has a corrugated cross section having alternating peak portions and trough portions formed in the vehicle width direction.

3. The vehicle body rear structure according to claim 2, wherein the stiffening panel further comprises a stiffening structure, and wherein the stiffening structure forms a part of the peak portions and trough portions of the corrugated cross section, and transmits the load input in the front-rear direction of a vehicle body.

4. The vehicle body rear structure according to claim 1, wherein the stiffening panel has a sandwich structure having an upper panel and a lower panel, and within the upper panel and lower panel sandwich at least one selected from a group of a foamed material, a filler, and a honeycomb material.

5. The vehicle body rear structure according to claim 1, wherein the stiffening panel has a sandwich structure having an upper panel and a lower panel whereby the upper panel and lower panel sandwich a core member, and a direction having a high rigidity in the core member is arranged along the front-rear direction of a vechicle body.

6. The vehicle body rear structure according to claim 1, further comprising: a front floor frame, wherein the stiffening panel transmits the load upon the rear-end collision to the front floor frame disposed in front of the stiffening panel.

7. The vehicle body rear structure according to claim 1, wherein the stiffening panel comprises an upper plate, a lower plate, and a connecting member which connects the upper plate and the lower plate.

* * * * *